(12) United States Patent
Croftcheck

(10) Patent No.: US 8,210,344 B2
(45) Date of Patent: Jul. 3, 2012

(54) FRAME ADAPTER ASSEMBLY FOR REPAIR OF A BELT CONVEYOR ASSEMBLY

(75) Inventor: Scott C. Croftcheck, Grindstone, PA (US)

(73) Assignee: Box 795, Inc., Allison, PA (US)

( * ) Notice: Subject to any disclaimer, the term of this patent is extended or adjusted under 35 U.S.C. 154(b) by 158 days.

(21) Appl. No.: 12/366,257

(22) Filed: Feb. 5, 2009

(65) Prior Publication Data

US 2009/0194394 A1 Aug. 6, 2009

Related U.S. Application Data

(60) Provisional application No. 61/026,295, filed on Feb. 5, 2008.

(51) Int. Cl.
*B65G 39/10* (2006.01)

(52) U.S. Cl. .................. 198/830; 198/828; 198/842

(58) Field of Classification Search .......... 198/830, 198/824, 825, 826, 827, 828, 842
See application file for complete search history.

(56) References Cited

U.S. PATENT DOCUMENTS

| | | | |
|---|---|---|---|
| 1,618,957 A | 2/1927 | Hunter | |
| 1,883,422 A | 10/1932 | Strong | |
| 2,437,499 A | 3/1948 | Benjamin | |
| 2,687,799 A | 8/1954 | Saxe | |
| 2,843,432 A | 7/1958 | Kindig | |
| 2,999,582 A * | 9/1961 | Ramer | 198/830 |
| 3,126,090 A | 3/1964 | Bitzer | |
| 3,545,601 A | 12/1970 | Cressman | |
| 3,545,602 A | 12/1970 | McCullagh | |
| 3,946,858 A * | 3/1976 | Diantonio | 198/830 |
| 4,029,200 A * | 6/1977 | Dillon | 198/830 |
| 4,032,002 A * | 6/1977 | Jackson | 198/808 |
| 4,049,328 A * | 9/1977 | Ouska et al. | 384/487 |
| 5,044,490 A | 9/1991 | East | |
| 5,197,592 A * | 3/1993 | East | 198/830 |
| 5,350,053 A * | 9/1994 | Archer | 198/525 |
| 5,927,478 A * | 7/1999 | Archer | 198/823 |
| 5,988,360 A | 11/1999 | Mott | |
| 5,988,361 A | 11/1999 | Giacomin et al. | |
| 6,349,819 B1 * | 2/2002 | Nohl et al. | 198/830 |
| 6,427,828 B1 | 8/2002 | East et al. | |
| 6,543,607 B2 | 4/2003 | Fischer et al. | |
| 6,550,606 B2 | 4/2003 | Tapp | |
| 6,634,490 B2 | 10/2003 | Fischer et al. | |
| 7,287,642 B1 * | 10/2007 | Carr et al. | 198/861.1 |
| 7,467,707 B1 | 12/2008 | Gabhart | |

(Continued)

FOREIGN PATENT DOCUMENTS

GB 2109327 A 6/1983

*Primary Examiner* — Joseph A Dillon, Jr.
(74) *Attorney, Agent, or Firm* — The Webb Law Firm

(57) ABSTRACT

A frame adapter assembly for use in connection with a belt conveyor assembly including: a frame adapter body having a top surface and a bottom bearing surface for at least partially contacting a surface of a belt conveyor frame; at least one bracket extending from the top surface of the frame adapter body for operatively engaging at least a portion of a shaft of at least one roller; and at least one attachment arrangement for removably or permanently attaching the frame adapter assembly to at least a portion of the existing belt conveyor frame. A method for repairing a belt conveyor assembly is also disclosed.

16 Claims, 10 Drawing Sheets

U.S. PATENT DOCUMENTS

| | | | |
|---|---|---|---|
| 7,530,450 B2 * | 5/2009 | Brunone | 198/825 |
| 7,950,520 B2 * | 5/2011 | Mott | 198/826 |
| 7,971,705 B2 * | 7/2011 | Jabber et al. | 198/830 |
| 8,028,824 B2 * | 10/2011 | Gorshe | 198/842 |
| 2004/0079621 A1 | 4/2004 | Mott | |
| 2010/0072037 A1 | 3/2010 | Jabber et al. | |

* cited by examiner

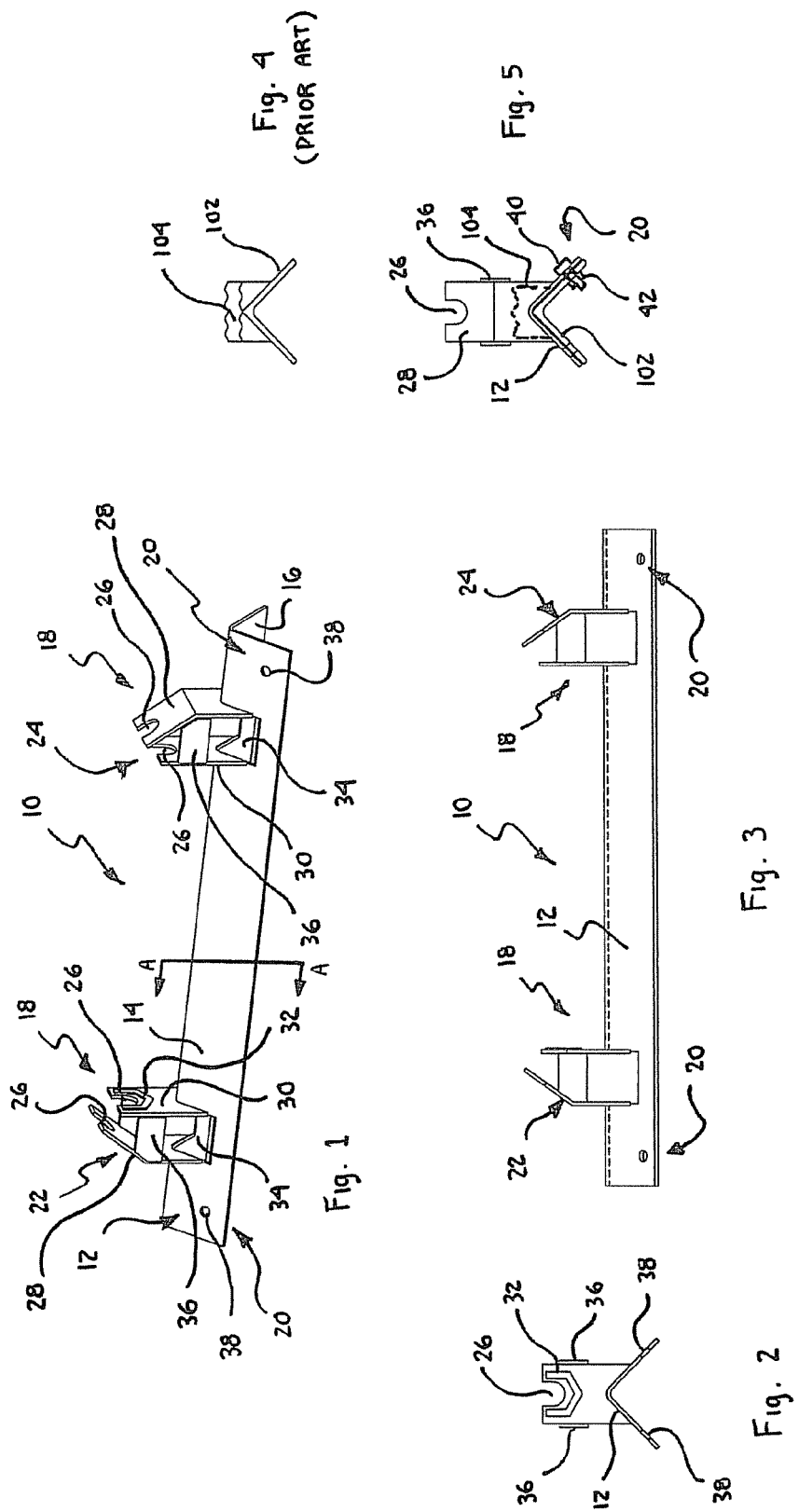

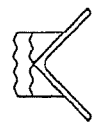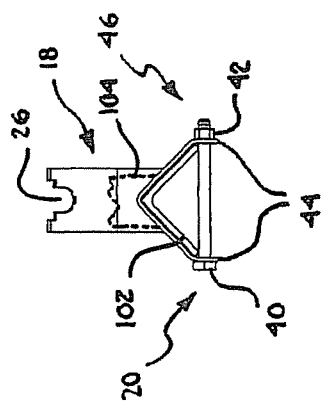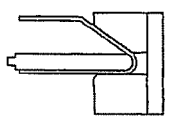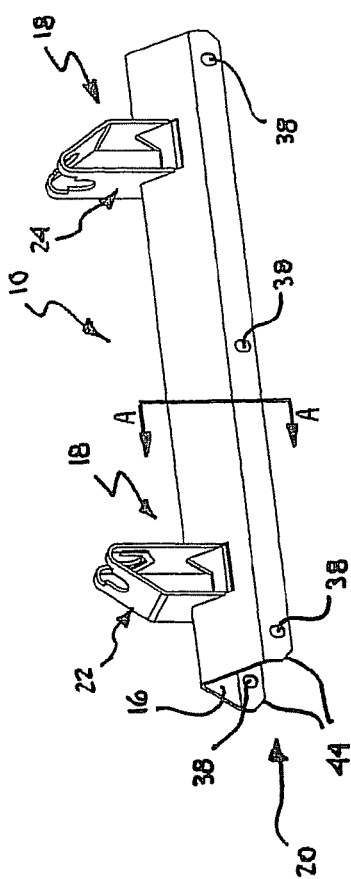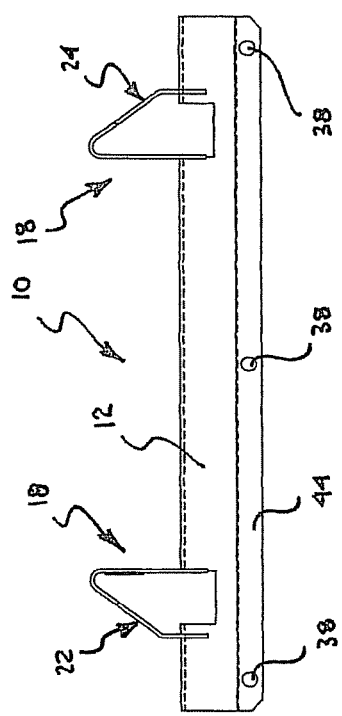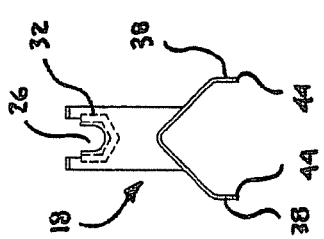

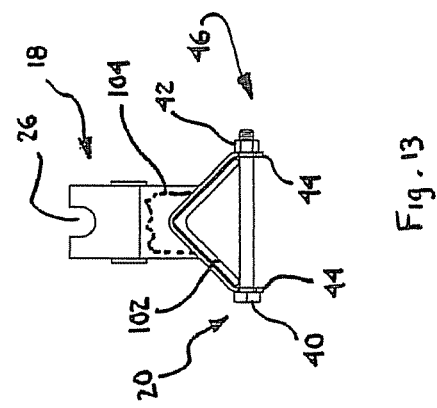
Fig. 13
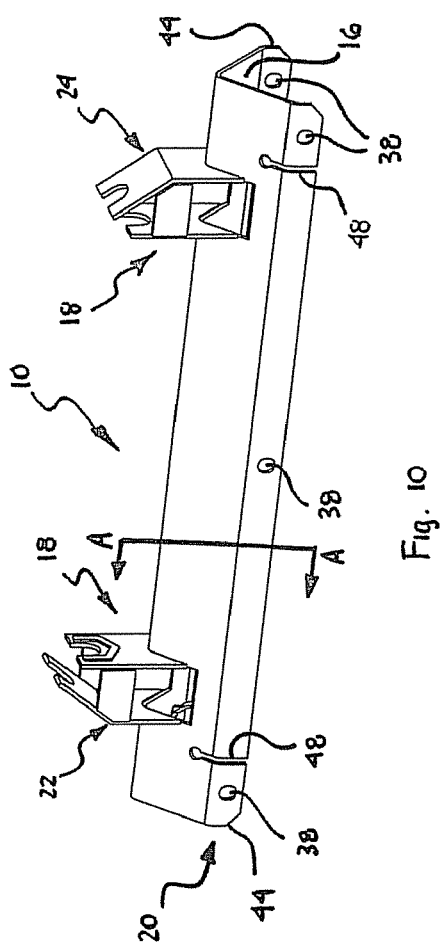
Fig. 10
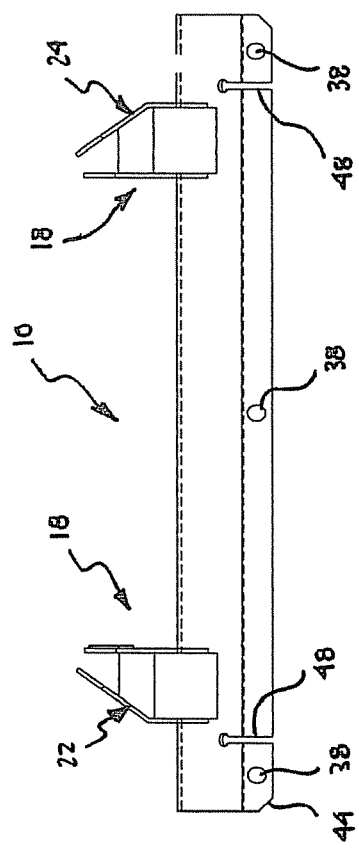
Fig. 12
Fig. 11

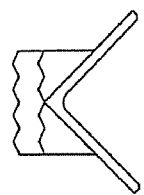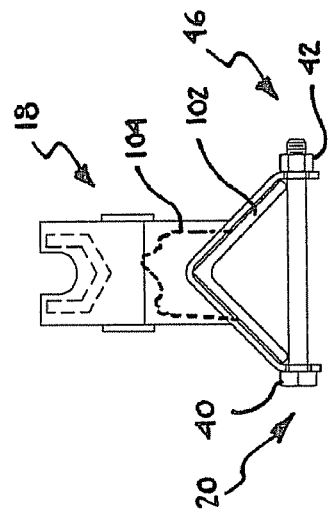
Fig. 17
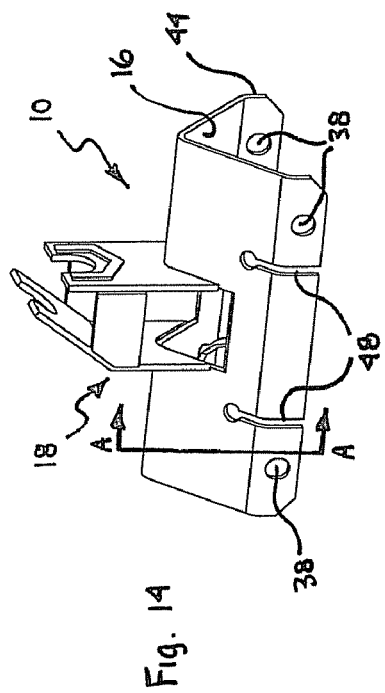
Fig. 14
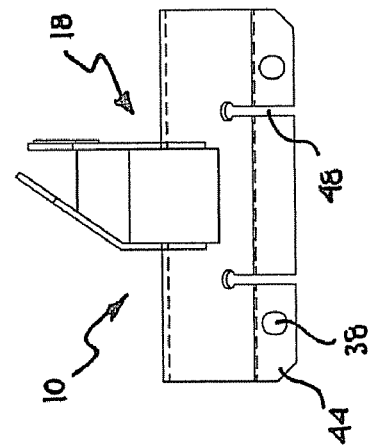
Fig. 16
Fig. 15

FRAME ADAPTER ASSEMBLY FOR REPAIR OF A BELT CONVEYOR ASSEMBLY

CROSS REFERENCE TO RELATED APPLICATIONS

This application claims the benefit of priority to U.S. Provisional Patent Application No. 61/026,295, filed Feb. 5, 2008, which is incorporated herein by reference in its entirety.

BACKGROUND OF THE INVENTION

1. Field of the Invention

The present invention relates generally to belt conveyor assemblies and systems used to convey material from one location to another and, in particular, to a method and apparatus for repairing certain portions of these belt conveyor assemblies and systems, such as damaged brackets and/or frames of belt conveyor assemblies and systems.

2. Description of Related Art

Belt conveyor assemblies and systems are commonly employed in a variety of applications and environments where material is to be transported from one location to another location. For example, such assemblies and systems are utilized in underground mining operations to move mined material from an interior part of the mine to a mine portal or mouth of the mine. Generally, these belt conveyor systems transfer material using a rubber belt riding over multiple frames, where each frame typically includes multiple brackets for attaching three rollers. The frames are placed at a distance of approximately four feet apart from each other to adequately support the belt and material positioned thereon. In certain belt arrangements, the center roller is placed in a horizontal or flat position, and the other two rollers are placed at various angles, e.g., 35 degree angles, with respect to the center roller, thereby creating a U-shaped belt member. The rollers, along with the belt, form a trough that ensures mined material remains on the belt conveyor.

These belt conveyors are typically operated continuously and are only rarely shut down to perform regular maintenance. This continuous use, along with increased production rates (which places a greater strain on the conveyor structure), has led to a high failure rate of certain belt conveyor systems in various environments. A frequent cause for the failure of the belt conveyor system is the deterioration of the frame assemblies and, in particular, the brackets for holding the rollers, which support the rubber belt.

Since belt conveyor systems can extend for miles, and the frames are located every four feet or so, the belt conveyor system may have thousands of frame and roller assemblies. When a roller bracket fails, typically, the entire frame assembly needs to be replaced. The new frames are generally shipped underground via the internal mine rail system. However, due to the tight constraints of the mine, the new frames often need to be manually carried by workers to the repair location. For example, these maintenance workers may have to carry the frames over 1000 feet, with the frames weighing up to 140 pounds. Additionally, the space to carry the frame is limited, and may only be 24 inches wide and as low as 60 inches in height. Further, these spaces can be located next to an unguarded belt that is running while the frame is being transported.

Generally, replacing the conveyor frame takes about 45 minutes using three maintenance workers. While the repair is taking place, the belt conveyor is shut down, resulting in a stoppage of mining operations. After the repair is completed, the old frame needs to be hand carried by workers for shipment outside the mine for disposal. The weight of the frame, as well as the space constraints, makes repairing the belt conveyor a difficult and time-consuming task.

SUMMARY OF THE INVENTION

It is, therefore, an object of the present invention to provide a method and apparatus for repair of a belt conveyor assembly that overcomes some or all of the deficiencies present in the prior art. It is another object of the present invention to provide a method and apparatus for repair of a belt conveyor assembly that minimizes the time needed to make such repairs. It is a further object of the present invention to provide a method and apparatus for repair of a belt conveyor assembly that increases the efficiency at which such repairs can be made. It is yet another object of the present invention to provide a method and apparatus for repair of a belt conveyor assembly that provides additional safety for the personnel involved in these repair procedures.

Accordingly, and in a preferred and non-limiting embodiment, the present invention provides a frame adapter assembly for use in connection with a belt conveyor assembly having a belt conveyor frame with a plurality of brackets supporting at least one roller, which directly or indirectly supports a belt member. The frame adapter assembly includes: a frame adapter body having a top surface and a bottom bearing surface for at least partially contacting a surface of the belt conveyor frame; at least one bracket extending from the top surface of the frame adapter body for operatively engaging at least a portion of a shaft of the at least one roller; and at least one attachment arrangement for removably or permanently attaching the frame adapter assembly to at least a portion of the existing belt conveyor frame.

In another preferred and non-limiting embodiment, the present invention provides a method for repairing a belt conveyor assembly having a belt conveyor frame with a plurality of brackets supporting at least one roller, which directly or indirectly supports a belt member. The method includes: cutting, bending and/or removing at least a portion of at least one bracket of the belt conveyor frame; positioning a frame adapter body having a top surface and a bottom bearing surface at least partially on a surface of the belt conveyor frame, wherein the frame adapter body includes at least one bracket extending from the top surface thereof, the at least one bracket configured to operatively engage at least a portion of a shaft of the at least one roller; and removably or permanently attaching the frame adapter assembly to at least a portion of the existing belt conveyor frame.

In yet another preferred and non-limiting embodiment, the present invention provides a frame adapter assembly for use in connection with a belt conveyor assembly having a belt conveyor frame with a plurality of brackets supporting at least one roller, which directly or indirectly supports a belt member. The frame adapter assembly includes: a frame adapter body having a top surface and a bottom bearing surface for at least partially contacting a surface of the belt conveyor frame; a first and a second bracket, each extending from the top surface of the frame adapter body and including a first side surface and a second side surface, each with a respective roller mounting slot, where at least a portion of the first side surface of the first bracket is angled and the corresponding roller mounting slot is configured to receive at least a portion of a shaft of a first roller, and the second side surface of the first bracket is substantially vertical and the corresponding mounting slot is configured to receive at least a portion of a shaft of a second roller, and where at least a portion of the first side surface of the second bracket is angled and the corresponding roller mounting slot is configured to receive at least a portion of a shaft of a third roller, and the second side surface of the second bracket is substantially vertical and the corresponding mounting slot is configured to receive at least a portion of the shaft of the second roller; and at least one attachment arrangement for removably or permanently attaching the frame adapter assembly to at least a portion of the existing belt conveyor frame.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 1 is a perspective view of one embodiment of a frame adapter assembly according to the principles of the present invention;

FIG. 2 is a sectional view along lines A-A of the frame adapter assembly of FIG. 1;

FIG. 3 is a front view of the frame adapter assembly of FIG. 1;

FIG. 4 is an edge view of a frame and bracket portion of a conveyor belt assembly according to the prior art, with the bracket partially removed;

FIG. 5 is an edge view of the frame adapter assembly of FIG. 1 installed on the frame and bracket portion of FIG. 4;

FIG. 6 is a perspective view of another embodiment of a frame adapter assembly according to the principles of the present invention;

FIG. 7 is a sectional view along lines A-A of the frame adapter assembly of FIG. 6;

FIG. 8 is a front view of the frame adapter assembly of FIG. 6;

FIG. 9 is an edge view of the frame adapter assembly of FIG. 6 installed on the frame and bracket portion of FIG. 4;

FIG. 10 is a perspective view of a further embodiment of a frame adapter assembly according to the principles of the present invention;

FIG. 11 is a sectional view along lines A-A of the frame adapter assembly of FIG. 10;

FIG. 12 is a front view of the frame adapter assembly of FIG. 10;

FIG. 13 is an edge view of the frame adapter assembly of FIG. 10 installed on the frame and bracket portion of FIG. 4;

FIG. 14 is a perspective view of another embodiment of a frame adapter assembly according to the principles of the present invention;

FIG. 15 is a sectional view along lines A-A of the frame adapter assembly of FIG. 14;

FIG. 16 is a front view of the frame adapter assembly of FIG. 14;

FIG. 17 is an edge view of the frame adapter assembly of FIG. 14 installed on the frame and bracket portion of FIG. 4;

DETAILED DESCRIPTION OF THE PREFERRED EMBODIMENT(S)

Figure 18:
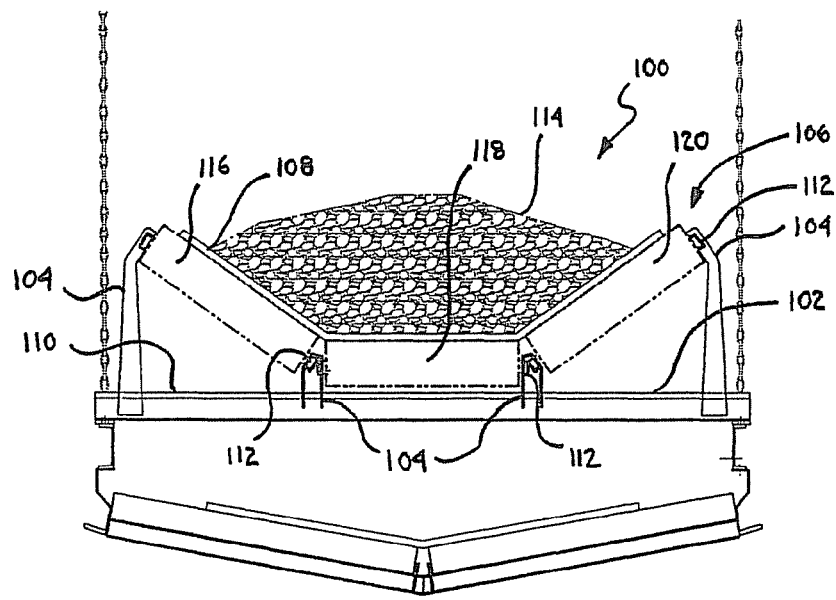
FIG. 18 is a front view of a belt conveyor assembly according to the prior art.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

The present invention relates generally to a frame adapter assembly 10, as illustrated in various embodiments and forms in FIGS. 1-3 and 5-17, as well as a method for repairing a belt conveyor assembly 100, as illustrated in FIGS. 19-28. As discussed, the presently-invented frame adapter assembly 10 and method are for specific use in repairing an existing belt conveyor assembly 100, as illustrated in FIG. 18 and in partial form in FIG. 4. In particular, the belt conveyor assembly 100 includes a belt conveyor frame 102 with multiple brackets 104 supporting one or more rollers 106. Further, these rollers 106 directly or indirectly support a belt member 108.

The brackets 104 extend from a surface 110 of the frame 102, and include appropriate structure (e.g., slots) to hold or support one or more shafts 112 of one or more rollers 106. In this manner, the belt member 108 is movable over the rollers 106 and, thus, able to support a specified material 114 to be transported from one location to another. However, as discussed above, based upon the mechanical interrelationship between the various components of the belt conveyor assembly 100, together with the continual use and rough environment, various portions and pieces of the belt conveyor assembly 100 are prone to breakage, and it is normally the brackets 104 that break or are damaged. Accordingly, it is one primary purpose of the present invention to provide a frame adapter assembly 10 and method for repairing the belt conveyor assembly 100 when it breaks, with specific reference to these broken or damaged brackets 104.

Various views of one preferred and non-limiting embodiment of a frame adapter assembly 10 according to the present invention is illustrated in FIGS. 1-3 and 5. As seen therein, the frame adapter assembly 10 includes a frame adapter body 12 having a top surface 14 and a bottom, bearing surface 16. The bottom, bearing surface 16 is sized and shaped so as to at least partially contact (i.e., bear against) a surface 110 of the belt conveyor frame 102. Further, one or more brackets 18 extend from the top surface 14 of the frame adapter body 12 and are configured for operative engagement with at least a portion of the shaft 112 of one or more rollers 106. Finally, at least one attachment arrangement 20 is used for removably or permanently attaching the frame adapter assembly 10 to at least a portion of the existing belt conveyor frame 102, and preferably providing removable or permanent contact between the bottom, bearing surface 16 of the frame adapter body 12 and the surface 110 of the frame 102.

In the embodiment of FIGS. 1-3 and 5, a first bracket 22 and a second bracket 24 each extend from the top surface 14 of the frame adapter body 12, and each bracket 22, 24 includes two roller mounting slots 26 sized and shaped so as to receive at least a portion of a shaft 112 of a roller 106. In particular, each of the brackets 22, 24 include a first side surface 28 and a second side surface 30, with each of the side surfaces 28, 30 having a respective roller mounting slot 26.

In this embodiment and with reference to FIG. 18, the brackets 104 that are to be replaced are the brackets 104 centrally located on the belt conveyor frame 102, each operatively engaging two rollers 106 simultaneously. As best seen in FIG. 18, and in one preferred and non-limiting embodiment, the centrally-located brackets 104 must effectively support the rollers 106 in an orientation that effectively provides a U-shaped orientation to the belt member 108. This orientation and arrangement allows more material 114 to be transported, and reduces the risk of spillage of the material 114 during the transportation process.

Accordingly, in this embodiment, at least a portion of the first side surface 28 of the first bracket 22 is angled, such that the corresponding roller mounting slot 26 is likewise angled to receive a portion of the shaft 112 of a first roller 116. In addition, the second side surface 30 of the first bracket 22 is substantially vertical, thereby providing a corresponding vertically-oriented roller mounting slot 26 for receiving at least a portion of the shaft 112 of a second roller 118. This orientation is also used in connection with the second bracket 24. Specifically, at least a portion of the first side surface 28 of the second bracket 24 is angled, thereby providing an angled roller mounting slot 26 for receiving at least a portion of the shaft 112 of a third roller 120. The second side surface 30 of the second bracket 24 is substantially vertical, thereby providing a substantially vertical and corresponding roller mounting slot 26, for receiving at least a portion of the shaft 112 of the second roller 118.

As discussed in greater detail hereinafter, the frame adapter assembly 10 may be used in the reparation process of the existing belt conveyor assembly 100. In short, the existing brackets 104 are bent, removed, cut, etc. (as illustrated in FIG. 4), and the frame adapter assembly 10 installed on the surface 110 of the belt conveyor frame 102. The rollers 116, 118, 120 would then be attached to create the U-shaped configuration illustrated in FIG. 18. Further, it is envisioned that one or more locking arrangements 32 could be used to removably engage the roller 106 with the bracket 18. This locking arrangement 32 may take the form of a locking nut, sleeve, etc., or some frictional engagement structure for locking or engaging the shaft 112 of the roller 106 with each bracket 18, while still permitting at least a portion of the roller 106 to rotate. Any known locking arrangement 32 is envisioned for accomplishing this function.

As discussed above, in order to install the frame adapter assembly 10 to the existing belt conveyor frame 102, the existing brackets 104 are bent, cut, removed, etc., often still leaving a portion of the bracket 104 protruding from the surface 110 of the frame 102 (see FIG. 4). Accordingly, the frame adapter body 12 may include an opening 34 extending therethrough for receiving at least a portion of the existing bracket 104 at least partially therethrough. Such an arrangement is illustrated in FIG. 5. Further, when using the bracket arrangement of FIGS. 1-3 and 5, support bars 36 may be attached between the first side surface 28 and second side surface 30 of each bracket 22, 24, thereby providing structural rigidity to each bracket 22, 24.

In order to attach the frame adapter assembly 10 to the existing belt conveyor frame 102, and in this preferred and non-limiting embodiment, the attachment arrangement 20 includes multiple attaching holes 38 extending through the frame adapter body 12. It is envisioned that the attaching holes 38 could be used to attach the frame adapter assembly 10 to the belt conveyor frame 102 by using welds, rivets or the like. Alternatively, and as illustrated in FIG. 5, the attachment arrangement 20 may also use attaching holes 122 extending through the existing belt conveyor frame 102, which are aligned with at least one respective attaching hole 38 of the frame adapter assembly 10. In operation, a bolt 40 is positioned at least partially through the aligned attaching holes 38, 122 and a nut 42 threaded thereon. Such a nut-and-bolt attaching arrangement 20 could be used in connection with any of the aligned attaching holes 38, 122. In this manner, the frame adapter assembly 10 is removably attached to the existing belt conveyor frame 102.

Still further, as is known in the prior art, the existing belt conveyor frame 102 is in an inverted substantially V-shaped form. Accordingly, the frame adapter body 12 may also be in a corresponding inverted substantially V-shaped form for at least partially contacting and bearing against the surface 110 of the frame 102. The use of such a shape and form allows for easy alignment, attachment and positioning of the frame adapter assembly 10 with respect to the existing belt conveyor frame 102.

A further preferred and non-limiting embodiment of the frame adapter assembly 10 is illustrated in FIGS. 6-9. In this embodiment, as opposed to using the support bars 36 discussed above, the brackets 22, 24 are contiguous or formed from a single piece of material. However, in operation and effect, the side surfaces 28, 30 and roller mounting slots 26 of this embodiment are substantially the same as that of the embodiment of FIGS. 1-3 and 5.

A further feature present in this embodiment is the use of mounting flanges 44. In particular, these mounting flanges 44 are opposed to each other, each having an aligned and opposing attaching hole 38 extending therethrough. Some attachment structure 46 is used in connection with these opposing mounting flanges 44 and attaching holes 38. For example, as illustrated in FIG. 9, a bolt 40 and nut 42 may be used and extend between two aligned and opposing attaching holes 38. In addition, and as seen, the mounting flanges 44 extend beyond the edges of the existing belt conveyor frame 102, such that, in installation, the bolt 40 and nut 42 can be used to tighten and wedge or clamp the frame adapter body 12 over the existing belt conveyor frame 102. This provides an additional securing effect and engagement of the frame adapter assembly 10 with the belt conveyor frame 102.

A further preferred and non-limiting embodiment of the frame adapter assembly 10 of the present invention is illustrated in FIGS. 10-13. In this embodiment, the above-discussed mounting flanges 44 are used. However, and in order to relieve tension across the length of the frame adapter body 12, and to minimize bending, contortion or other negative effects during installation, relief slots 48 are formed on the mounting flanges 44 and/or frame adapter body 12. Such relief slots 48 allow the mounting flanges 44 (and to some extent at least a portion of the frame adapter body 12) to flex. This provides a more efficient and effective clamping function, without causing the deleterious effects discussed above, e.g., buckling, rippling, bending, etc.

A still further preferred and non-limiting embodiment of the present invention is illustrated in FIGS. 14-17. In this embodiment, the frame adapter body 12 is shorter than the previous embodiments, and includes only a single bracket 18 extending from the top surface 14 of the frame adapter body 12. Specifically, this arrangement can be used when only a single bracket 104 must be replaced, thereby avoiding the cutting and installation process for (and associated costs involved with) installing and replacing multiple brackets 104, when appropriate. It is further envisioned that the bracket 18 can be fabricated and arranged so as to replace any of the existing brackets 104 extending from the belt conveyor frame 102. For example, it is envisioned that the frame adapter assembly 10 can be modified and used in connection with the outer brackets 104 (see FIG. 18), without departing from the spirit and scope of the present invention.

Figure 19:
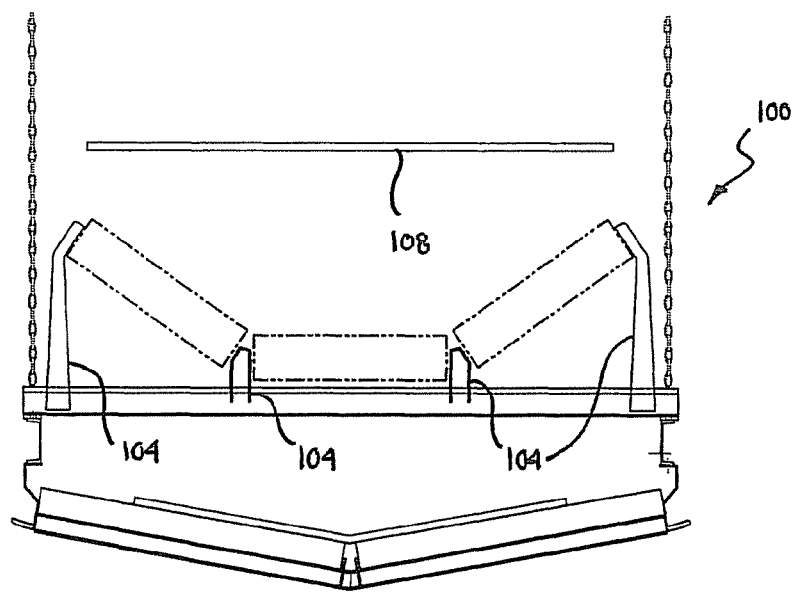
FIG. 19 is a front view of a step in one embodiment of a method for repair of the belt conveyor assembly of FIG. 18 according to the principles of the present invention.
Figure 20:
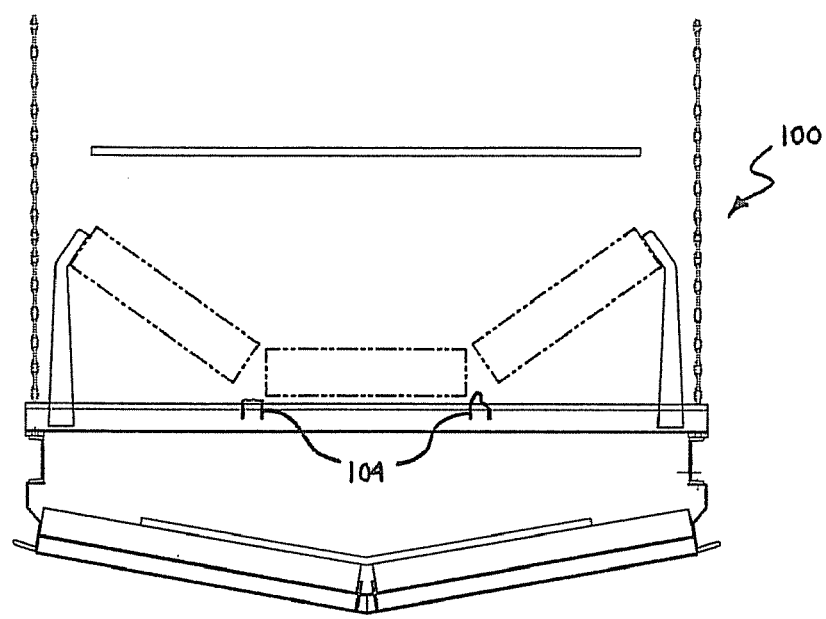
FIG. 20 is a front view of a further step in the method of FIG. 19.
Figure 21:
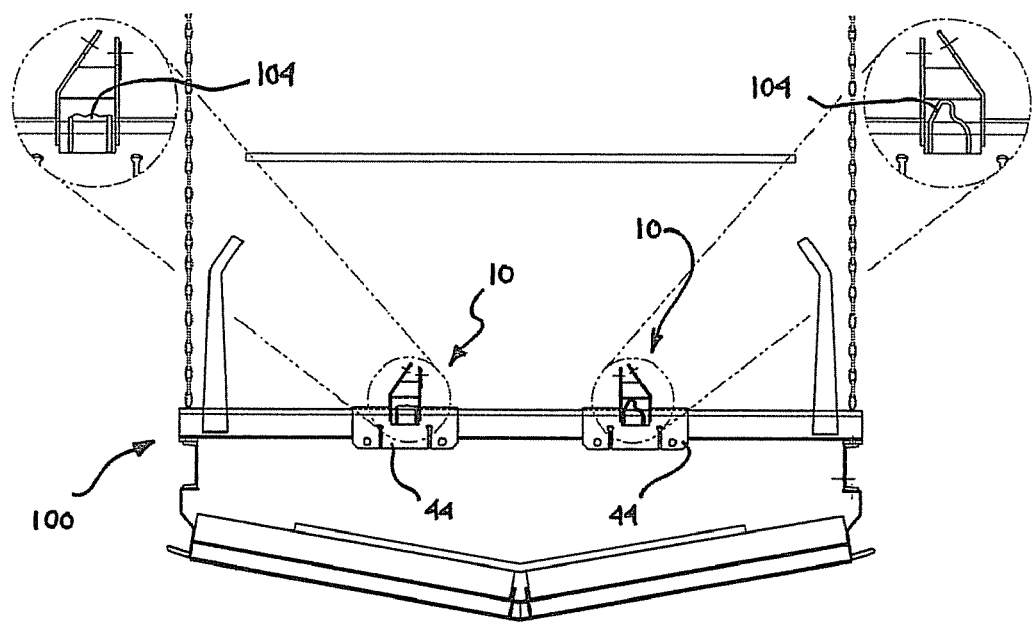
FIG. 21 is a front view of another step in the method of FIG. 19.

The present invention is further directed to a method for repairing the belt conveyor assembly 100, such as the belt conveyor assembly 100 of FIG. 18. In a first step, and as illustrated in FIG. 19, the belt member 108 is removed and/or disengaged from the rollers 106. Next, the existing brackets 104 are cut, bent, removed, etc., which is illustrated in FIG. 20. Further, as shown in FIG. 21 (which illustrates the embodiment of the frame adapter assembly 10 of FIGS. 14-17), the frame adapter assemblies 10 are positioned appropriately with respect to the existing brackets 104 in order to ensure proper alignment of the rollers 106.

Figure 22:
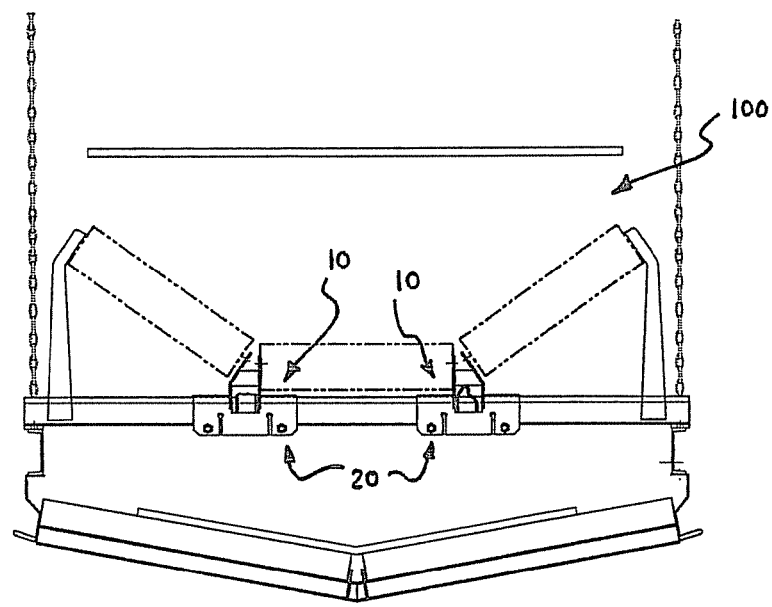
FIG. 22 is a front view of a further step in the method of FIG. 19.
Figure 23:
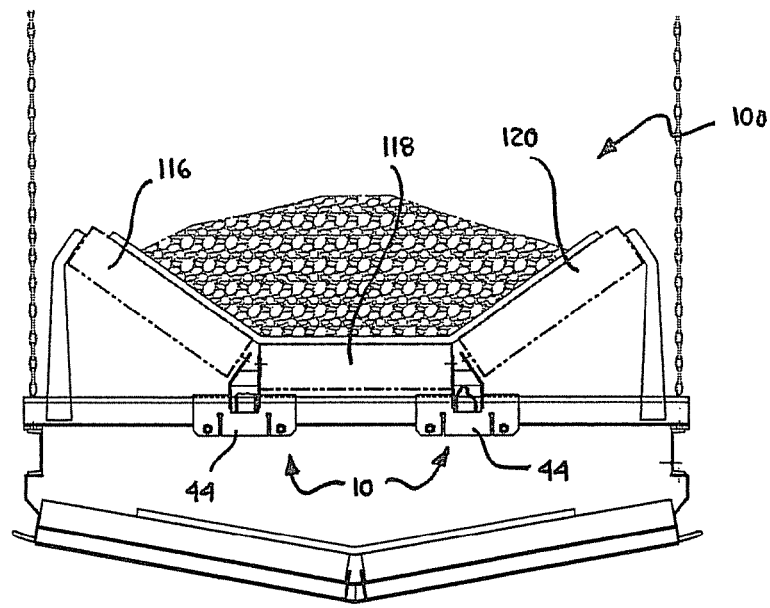
FIG. 23 is a front view of a still further step in the method of FIG. 19.
Figure 24:
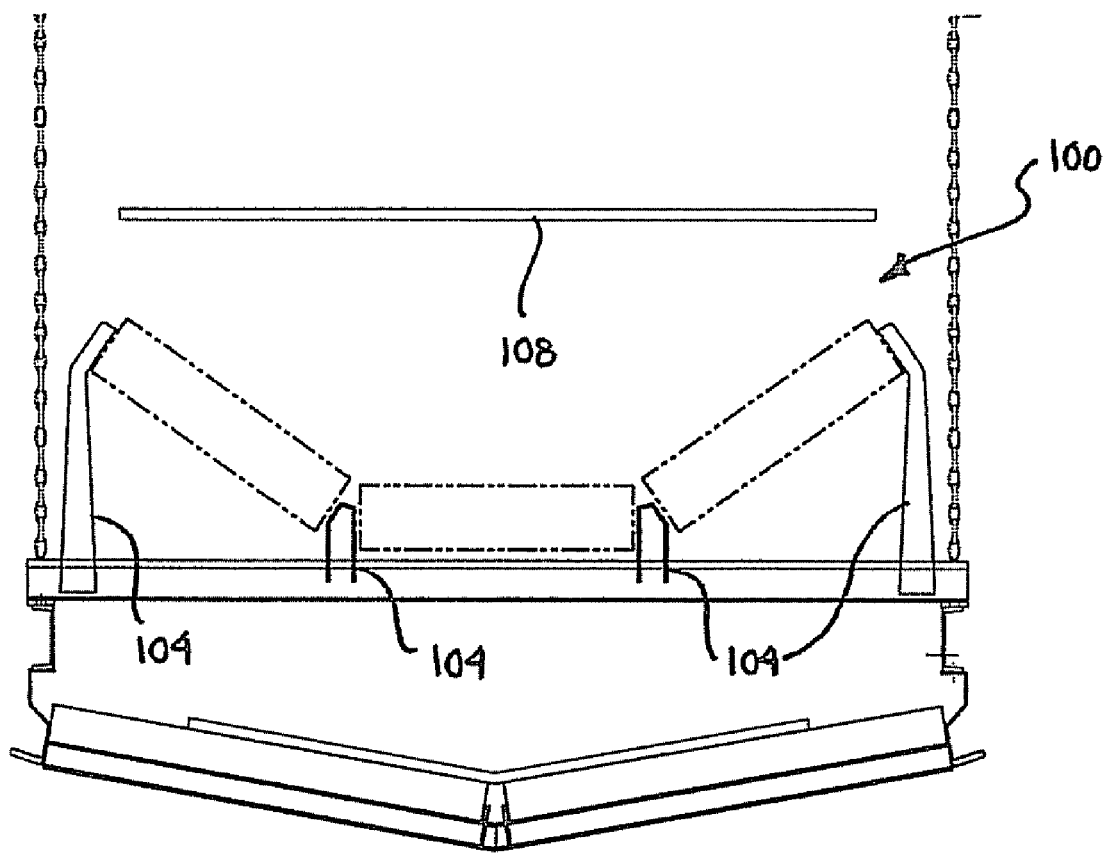
FIG. 24 is a front view of a step in a method for repair of the belt conveyor assembly of FIG. 18 according to the principles of the present invention.
Figure 25:
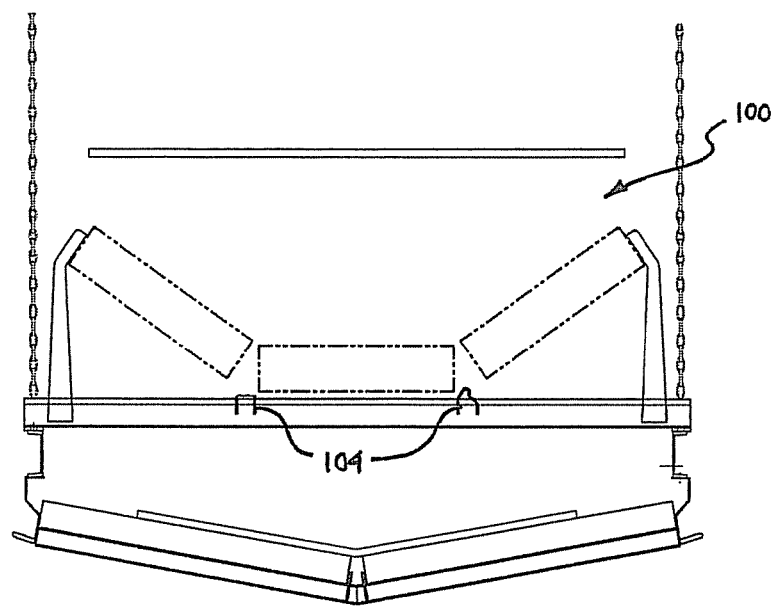
FIG. 25 is a front view of a further step in the method of FIG. 24.
Figure 26:
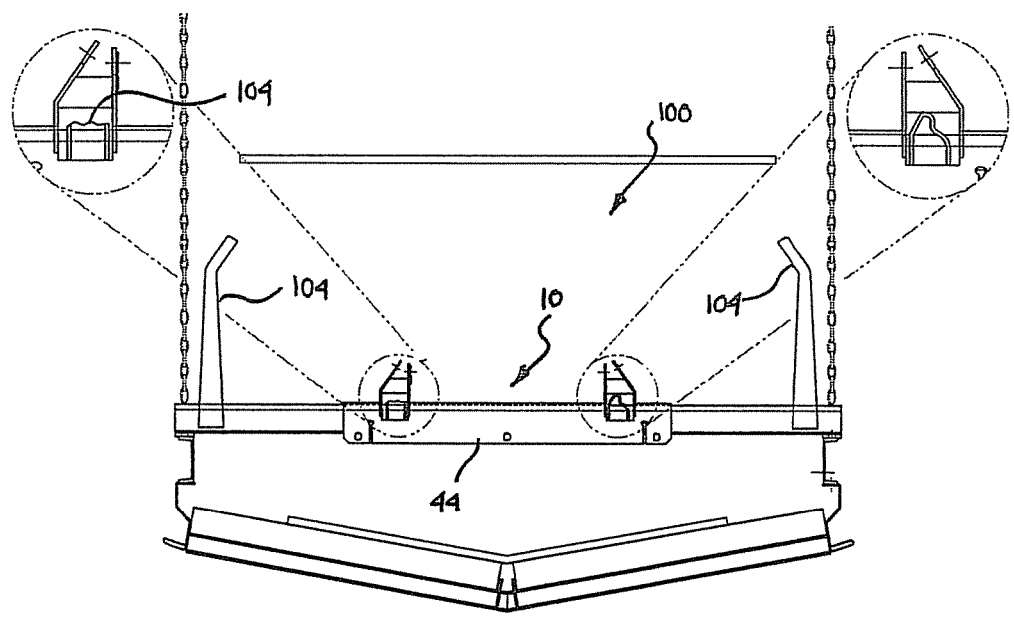
FIG. 26 is a front view of another step in the method of FIG. 24.
Figure 27:
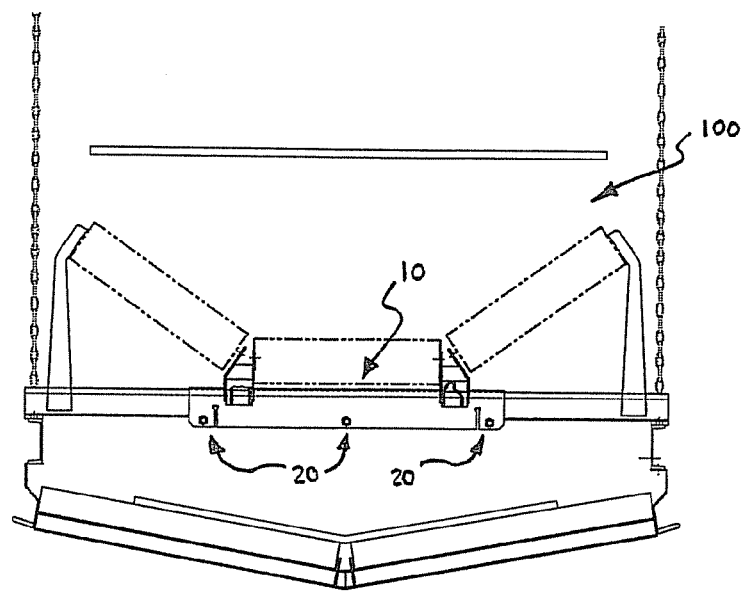
FIG. 27 is a front view of a further step in the method of FIG. 24.
Figure 28:
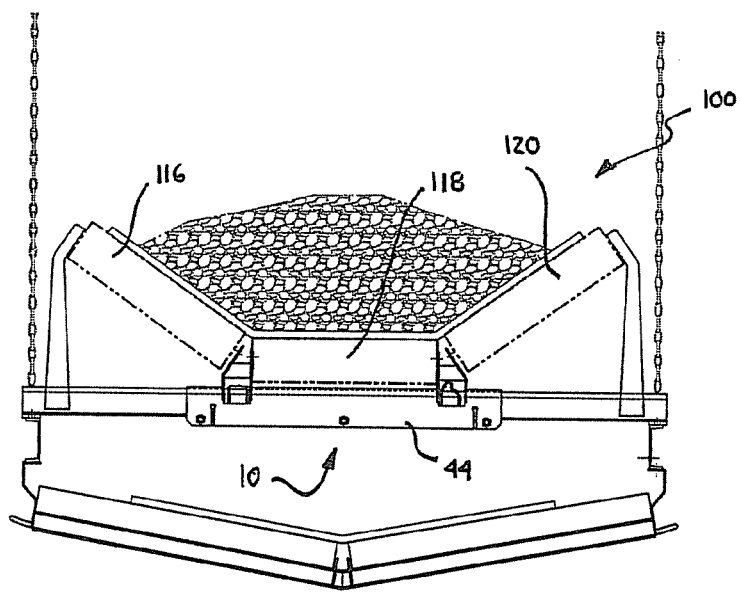
FIG. 28 is a front view of a still further step in the method of FIG. 24.

As shown in FIG. 22, the frame adapter assemblies 10 are attached to the existing belt conveyor frame 102, and in this embodiment, the bolt 40 and nut 42 attachment arrangement 20 is used in connection with the attaching holes 38 and mounting flanges 44. The rollers 106, e.g., the first roller 116, the second roller 118, and the third roller 120, are appropriately inserted in the brackets 18, 104, and the belt member 108 is lowered onto the rollers 106. Finally, as illustrated in FIG. 23, the belt conveyor assembly 100 is reintroduced to operation and the material 114 transported in an effective manner. These same steps are illustrated in sequential form in FIGS. 24-28 when using the embodiment of the frame adapter assembly 10 illustrated in FIGS. 10-13.

With respect to any of the embodiments discussed above, the frame adapter assemblies 10 may be sized, shaped, and dimensioned to fit over a variety of existing belt conveyor frames 102. For example, the existing belt conveyor frames 102 may be in the form of tubes, beams, channels, angles, etc. Accordingly, the frame adapter body 12 of the frame adapter assembly 10 would be sized, shaped, and dimensioned to correspond with the shape of the existing belt conveyor frame 102, thereby allowing the frame adapter assembly 10 to be securely attached to any type of belt conveyor frame 102. Further the brackets 18 may be configured to support rollers 106 in any desired orientation or position, thus permitting use of the present invention in connection with a variety of differently-sized and -shaped belt conveyor assemblies 100 and belt member 108 shapes.

In one embodiment, the frame adapter assemblies 10, including the frame adapter body 12 and the brackets 18, may be fabricated from steel. However, other suitable materials may be used. While, as discussed above, the attachment structure 46 may be a bolt 40 and nut 42 used in connection with the attaching holes 38, any such attaching arrangement is envisioned. For example, such attachment arrangements 20 may include welding, interference-fit pins, rivets, etc.

In this manner, the presently-invented frame adapter assembly 10 and method for repairing an existing belt conveyor assembly 100 provides substantial improvements over the current techniques used to repair such assemblies and systems. For example, the maintenance workers making the repair would only have to carry one of the frame adapter assemblies 10, which weigh significantly less than the entire belt conveyor frame 102 (or even a portion thereof). For example, the frame adapter assemblies 10 may weigh approximately forty-four pounds for those assemblies 10 having two brackets 18, and only twelve pounds for those having a single bracket 18. Such a weight reduction allows one person to transport and install any of the frame adapter assemblies 10.

Further, since the frame adapter assemblies 10 extend the service life of the existing belt conveyor frame 102 (by replacing deteriorated brackets 104 and reinforcing the existing belt conveyor frame 102), the second operation of removing and transporting the existing belt conveyor frame 102 is avoided. Still further, the present invention allows the belt conveyor assembly 100 to be repaired in much less time compared to replacing the existing belt conveyor frame 102. Since mining operations are typically shut down while the belt conveyor assembly 100 is being repaired, this time savings can be quite beneficial. It should be noted that while the present invention has been described in its application to belt conveyor assemblies 100 and systems employed in underground mining operations, the frame adapter assembly 10 and method of the present invention may also be readily applied to belt conveyor assemblies 100 used in other industries and fields.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A frame adapter assembly for use in connection with a belt conveyor, the frame adapter assembly comprising:
   a frame adapter body having a top surface and a bottom bearing surface configured to engage an existing belt conveyor frame with a plurality of existing brackets supporting at least one roller, which directly or indirectly support a belt member;
   at least one bracket extending from the top surface of the frame adapter body and configured to operatively engage at least a portion of a shaft of the at least one roller of the belt conveyor assembly, the bracket including a first side surface and a second side surface spaced apart from the first side surface, each of the first side surface and the second side surface being directly connected to and extending from the top surface of the frame adapter body; and at least one attachment arrangement configured to connect the frame adapter assembly to at least a portion of the existing belt conveyor frame, wherein the frame adapter body is configured to be positioned over the existing conveyor belt frame, such that the bottom bearing surface of the adapter frame contacts a surface of the existing belt conveyor frame, wherein the frame adapter body includes an opening extending through the frame adapter body from the bottom bearing surface to the top surface and disposed between the first side surface and the second side surface of the at least one bracket, wherein the opening is configured to receive a portion of one of the plurality of existing brackets when the bottom bearing surface of the frame adapter body engages the surface of the existing belt conveyor frame, wherein the first side surface and the second side surface of the at least one bracket are configured to receive the portion of the one of the plurality of existing brackets therebetween, and wherein the at least one bracket extending from the top surface of the frame adapter body is configured to engage at least a portion of a shaft of the at least one roller of the belt conveyor assembly.

2. The frame adapter assembly of claim 1, further comprising a plurality of brackets extending from the top surface of the frame adapter body and having at least one roller mounting slot configured to receive at least a portion of a shaft of the at least one roller.

3. The frame adapter assembly of claim 1, wherein each of the first and second side surfaces of the at least one bracket includes a respective roller mounting slot.

4. The frame adapter assembly of claim 3, wherein at least a portion of the first side surface of the at least one bracket is angled and the corresponding roller mounting slot configured to receive at least a portion of the shaft of a first roller, and the second side surface of the at least one bracket is substantially vertical and the corresponding mounting slot configured to receive at least a portion of the shaft of a second roller.

5. The frame adapter assembly of claim 4, further comprising a first and a second bracket, each extending from the top surface of the frame adapter body and including a first side surface and a second side surface, each with a respective roller mounting slot, wherein at least a portion of the first side surface of the first bracket is angled and the corresponding roller mounting slot is configured to receive at least a portion of a shaft of a first roller, and the second side surface of the first bracket is substantially vertical and the corresponding mounting slot is configured to receive at least a portion of a shaft of a second roller, and wherein at least a portion of the first side surface of the second bracket is angled and the corresponding roller mounting slot is configured to receive at least a portion of a shaft of a third roller, and the second side surface of the second bracket is substantially vertical and the corresponding mounting slot is configured to receive at least a portion of the shaft of the second roller.

6. The frame adapter assembly of claim 1, further comprising at least one locking arrangement configured to removably engage the at least one roller with the at least one bracket.

7. The frame adapter assembly of claim 1, wherein the at least one attachment arrangement comprises at least one attaching hole extending through the frame adapter body and configured for attachment to the belt conveyor frame by at least one weld.

8. The frame adapter assembly of claim 1, wherein the at least one attachment arrangement comprises at least one attaching hole extending through the frame adapter body and configured for attachment to the belt conveyor frame by aligning the at least one attaching hole with a corresponding attaching hole extending through the belt conveyor frame, wherein a bolt extends at least partially through the aligned attaching holes.

9. The frame adapter assembly of claim 1, wherein the frame adapter body is in an inverted substantially V-shaped form and configured to at least partially contact a surface of a correspondingly-shaped belt conveyor frame.

10. The frame adapter assembly of claim 1, wherein the attachment arrangement comprises a plurality of opposing mounting flanges, each having at least one aligned and opposing attaching hole extending therethrough, wherein an attachment structure is in operational engagement with the attaching hole of each mounting flange.

11. The frame adapter assembly of claim 10, wherein the attachment structure is a bolt with a shaft positionable at least partially through the attaching holes and secured by at least one nut threaded thereon.

12. The frame adapter assembly of claim 10, wherein, in installation, the opposing mounting flanges extend beyond edges of the belt conveyor frame.

13. The frame adapter assembly of claim 10, further comprising at least one relief slot extending through at least a portion of the mounting flange.

14. The frame adapter assembly of claim 1, further comprising at least one relief slot extending through at least a portion of the frame adapter body.

15. A frame adapter assembly for use in connection with a belt conveyor, the frame adapter assembly comprising:

a frame adapter body having a top surface and a bottom bearing surface configured to engage an existing belt conveyor frame with a plurality of existing brackets supporting at least one roller, which directly or indirectly support a belt member;

a first and a second bracket, each extending from the top surface of the frame adapter body and including a first side surface and a second side surface spaced apart from the first side surface, each of the first side surface and the second side surface being directly connected to and extending from the top surface of the frame adapter body and having a respective roller mounting slot, wherein at least a portion of the first side surface of the first bracket is angled and the corresponding roller mounting slot is configured to receive at least a portion of a shaft of a first roller, and the second side surface of the first bracket is substantially vertical and the corresponding mounting slot is configured to receive at least a portion of a shaft of a second roller, and wherein at least a portion of the first side surface of the second bracket is angled and the corresponding roller mounting slot is configured to receive at least a portion of a shaft of a third roller, and the second side surface of the second bracket is substantially vertical and the corresponding mounting slot is configured to receive at least a portion of the shaft of the second roller; and at least one attachment arrangement configured to retrofit the frame adapter assembly to at least a portion of the existing belt conveyor frame, wherein the frame adapter body is configured to be positioned over the existing conveyor belt frame, such that the bottom bearing surface of the adapter frame contacts a surface of the existing belt conveyor frame, wherein the frame adapter body includes two openings extending through the frame adapter body from the bottom bearing surface to the top surface and disposed between the first side surface and the second side surface of each of the first and second bracket, wherein the openings are each configured to receive a portion of one of the plurality of existing brackets when the bottom bearing surface of the frame adapter body engages the surface of the existing belt conveyor frame, and wherein the first side surface and the second side surface of each of the first and second bracket are configured to receive the portion of the one of the plurality of existing brackets therebetween.

16. A frame adapter assembly for use in connection with a belt conveyor, the frame adapter assembly comprising:

a frame adapter body having a top surface and a bottom bearing surface configured to engage an existing belt conveyor frame with a plurality of existing brackets supporting at least one roller, which directly or indirectly support a belt member;

at least one bracket extending from the top surface of the frame adapter body and configured to operatively engage at least a portion of a shaft of the at least one roller of the belt conveyor assembly, the bracket including a first side surface and a second side surface spaced apart from the first side surface, each of the first side surface and the second side surface being directly connected to and extending from the top surface of the frame adapter body; and at least one attachment arrangement configured to connect the frame adapter assembly to at least a portion of the existing belt conveyor frame, wherein the frame adapter body is configured to be positioned over the existing conveyor belt frame, such that the bottom bearing surface of the adapter frame contacts a surface of the existing belt conveyor frame, wherein the frame adapter body includes an opening extending through the frame adapter body and disposed between the first side surface and the second side surface of the at least one bracket, wherein the opening is configured to receive a portion of one of the plurality of existing brackets when the bottom bearing surface of the frame adapter body engages the surface of the existing belt conveyor frame, wherein the first side surface and the second side surface of the at least one bracket are configured to receive the portion of the one of the plurality of existing brackets therebetween, wherein the at least one bracket extending from the top surface of the frame adapter body is configured to engage at least a portion of a shaft of the at least one roller of the belt conveyor assembly, and wherein each of the first and second side surfaces of the at least one bracket includes a respective roller mounting slot, wherein at least a portion of the first side surface of the at least one bracket is angled and the corresponding roller mounting slot configured to receive at least a portion of the shaft of a first roller, and the second side surface of the at least one bracket is substantially vertical and the corresponding mounting slot configured to receive at least a portion of the shaft of a second roller, and wherein the at least one bracket comprises a first bracket and a second bracket, each ending from the top surface of the frame adapter body and including a first side surface and a second side surface, each with a respective roller mounting slot, wherein at least a portion of the first side surface of the first bracket is angled and the corresponding roller mounting slot is configured to receive at least a portion of a shaft of a first roller, and the second side surface of the first bracket is substantially vertical and the corresponding mounting slot is configured to receive at least a portion of a shaft of a second roller, and wherein at least a portion of the first side surface of the second bracket is angled and the corresponding roller mounting slot is configured to receive at least a portion of a shaft of a third roller, and the second side surface of the second bracket is substantially vertical and the corresponding mounting slot is configured to receive at least a portion of the shaft of the second roller.

* * * * *